W. WHALEY.
SHOVELING MACHINE.
APPLICATION FILED JULY 1, 1907. RENEWED SEPT. 7, 1909.
940,999.
Patented Nov. 23, 1909.
10 SHEETS—SHEET 1.
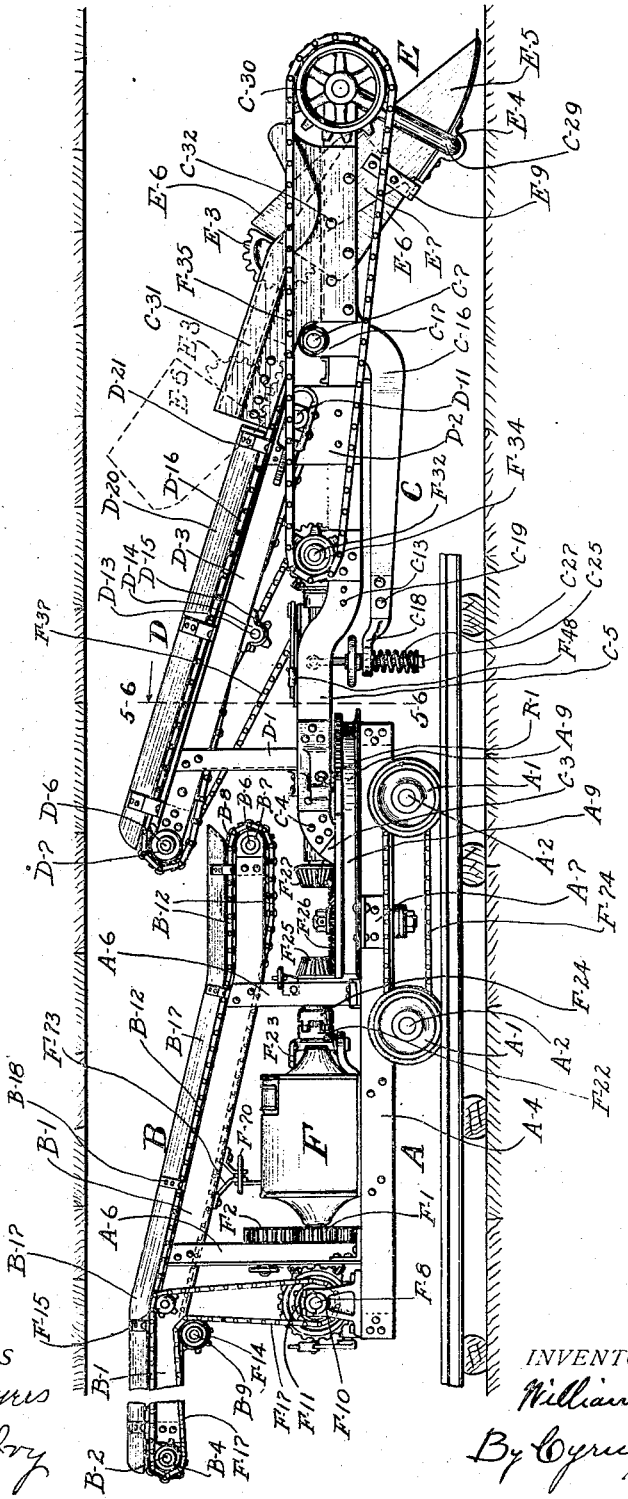

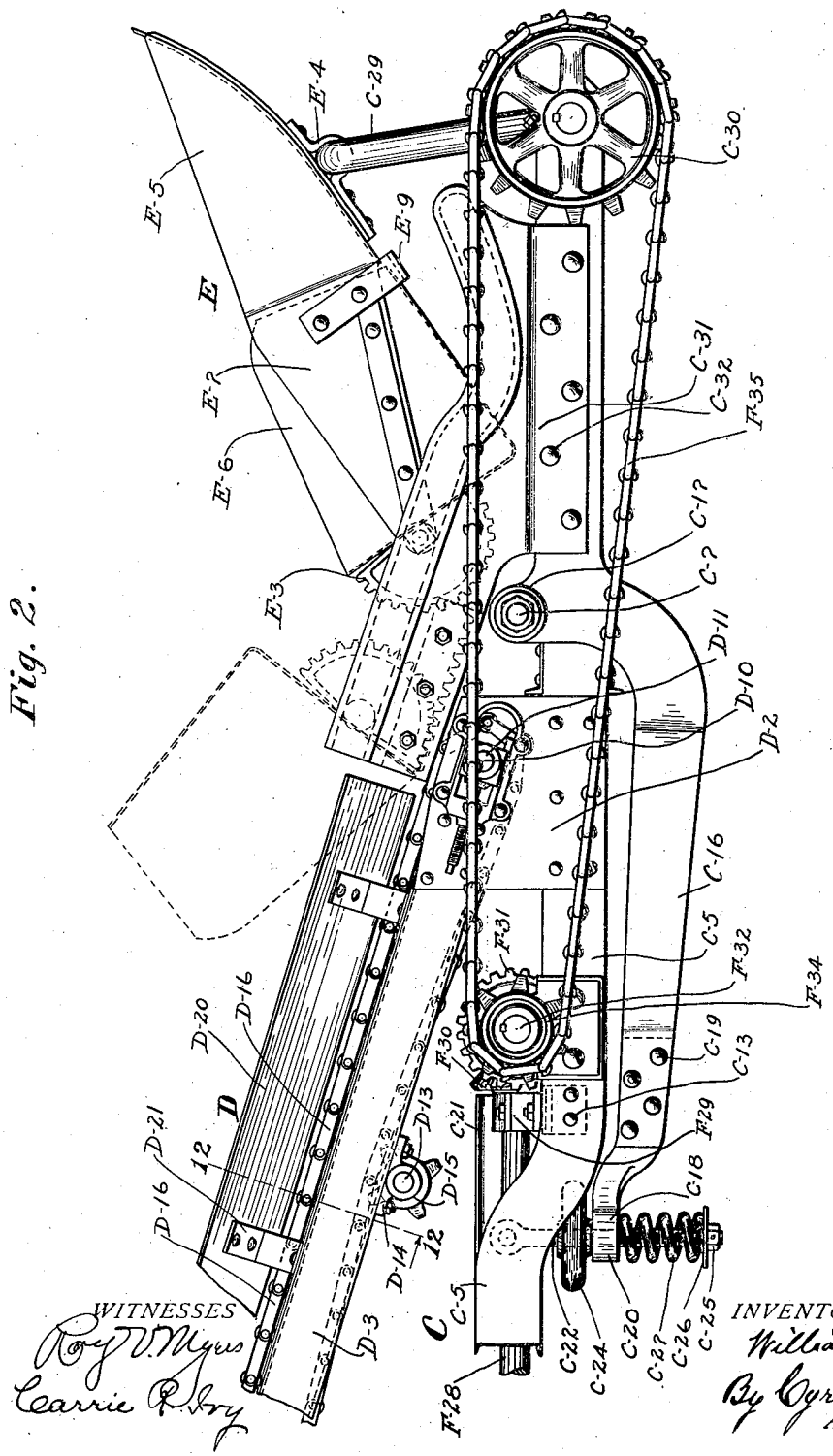

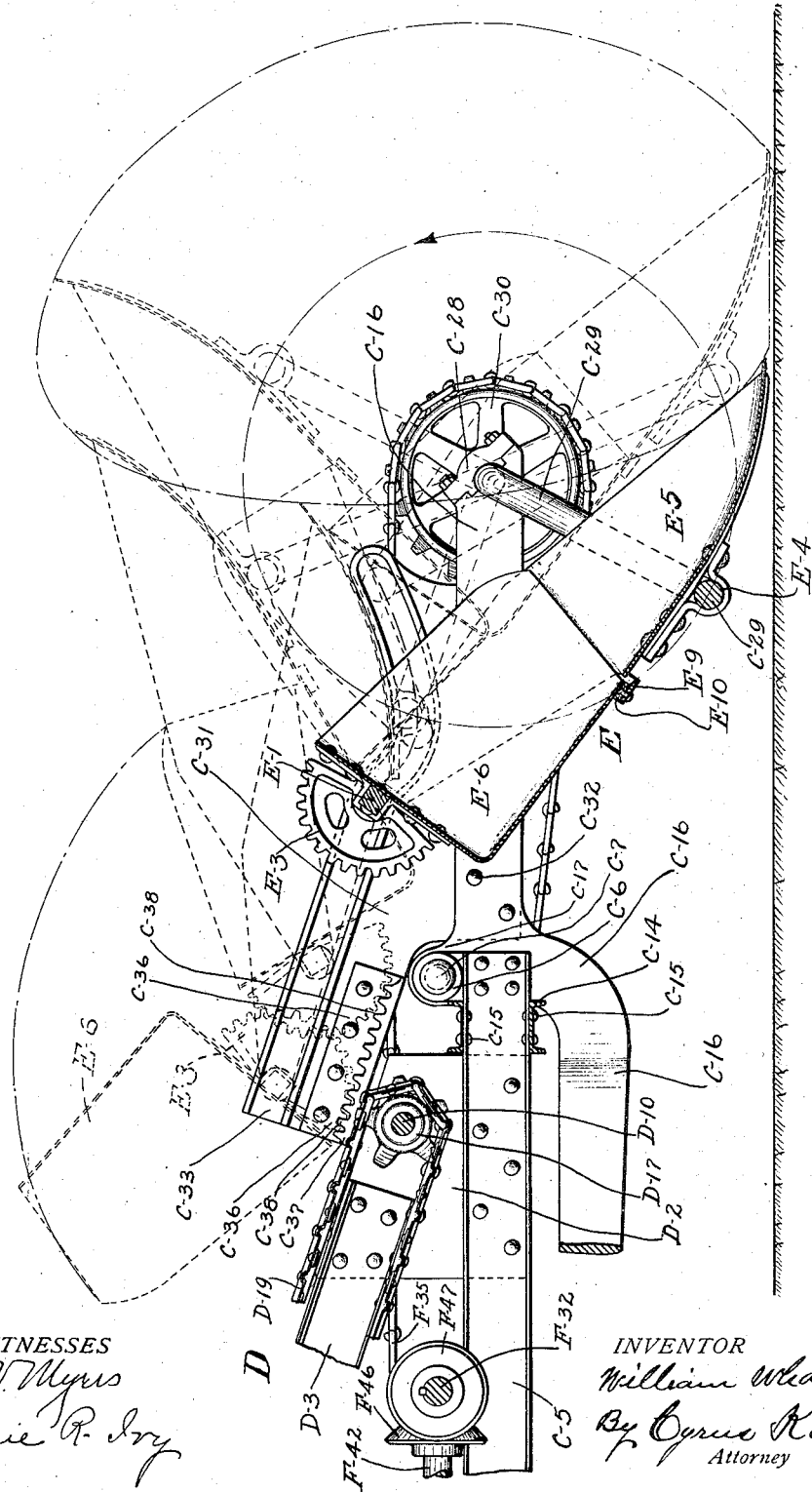

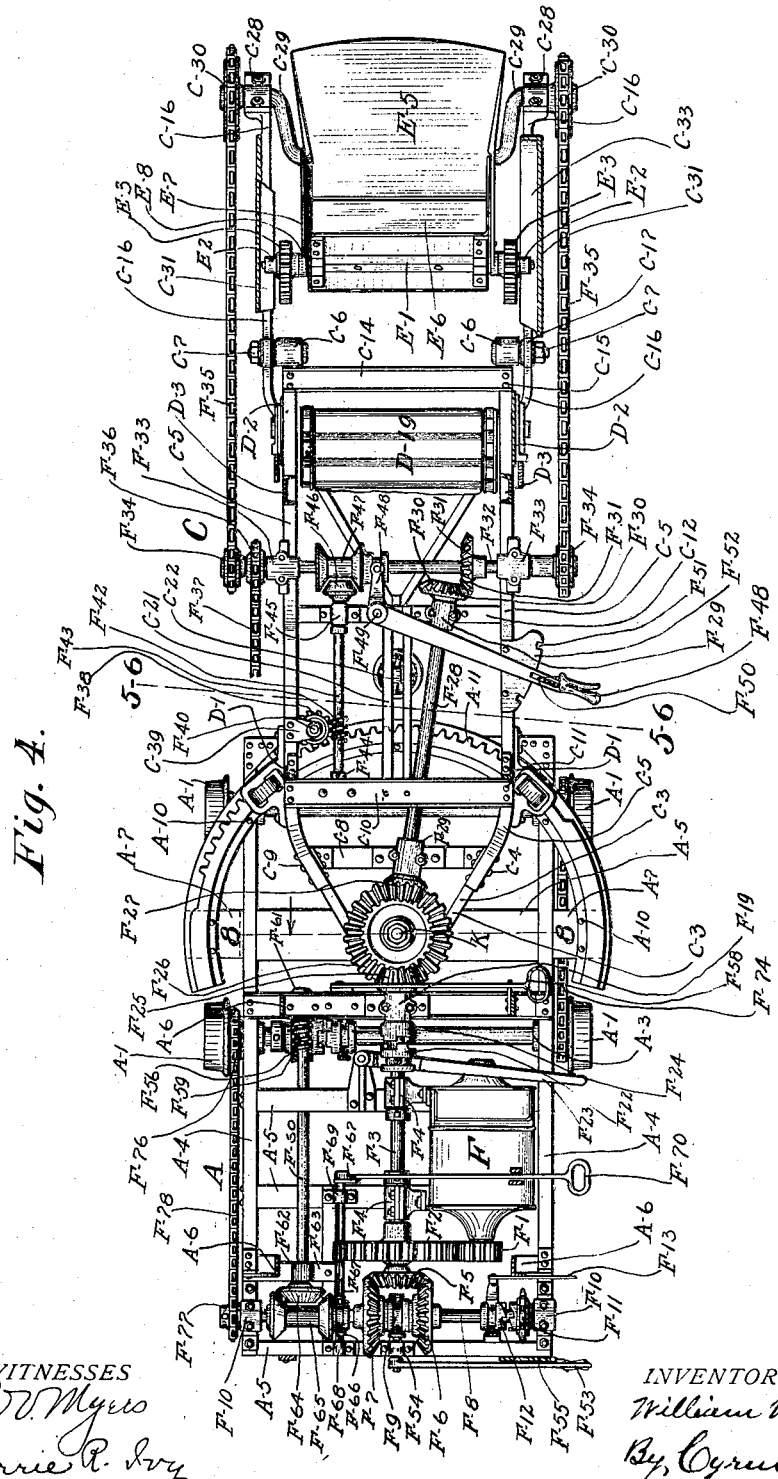

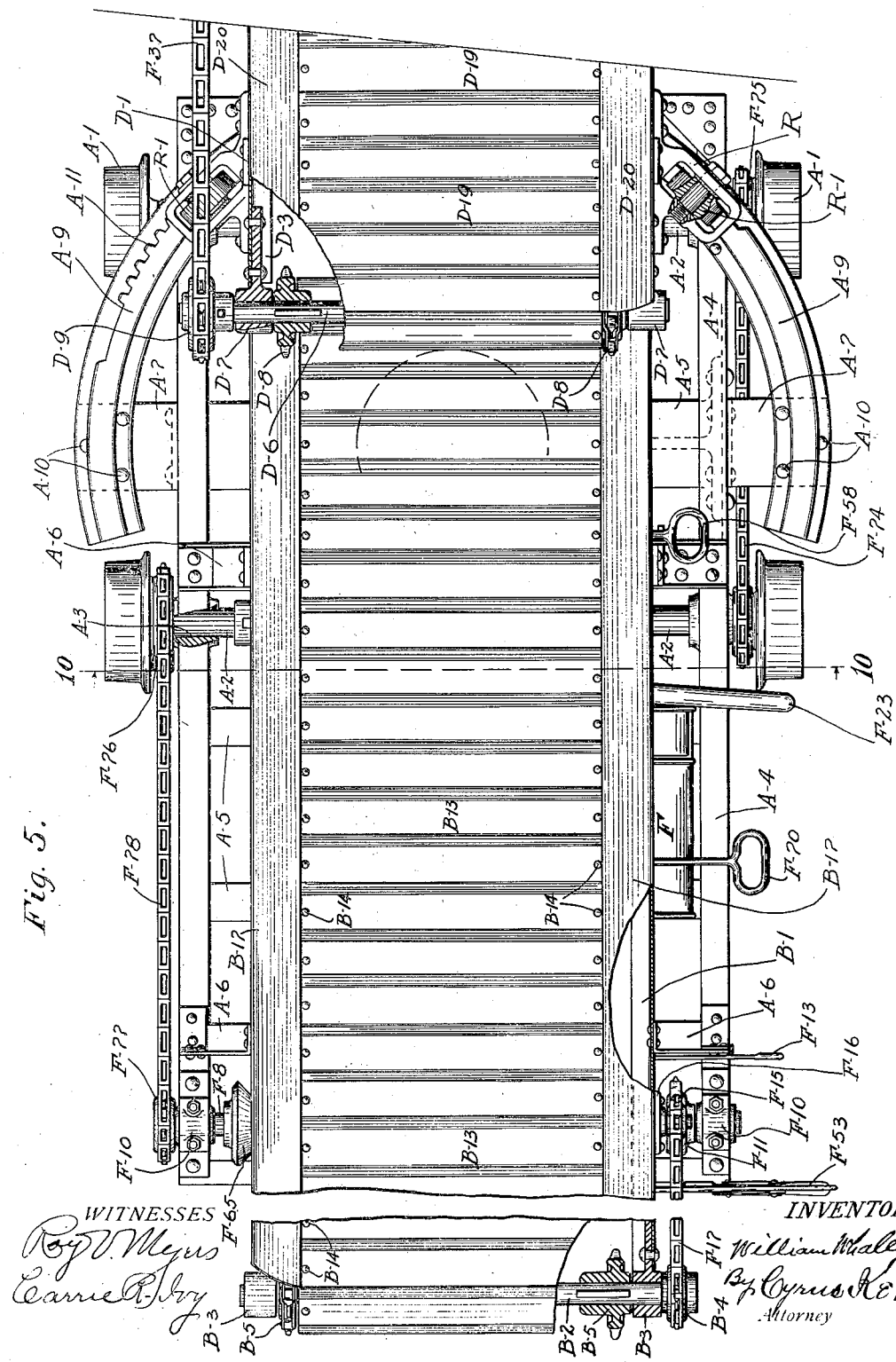

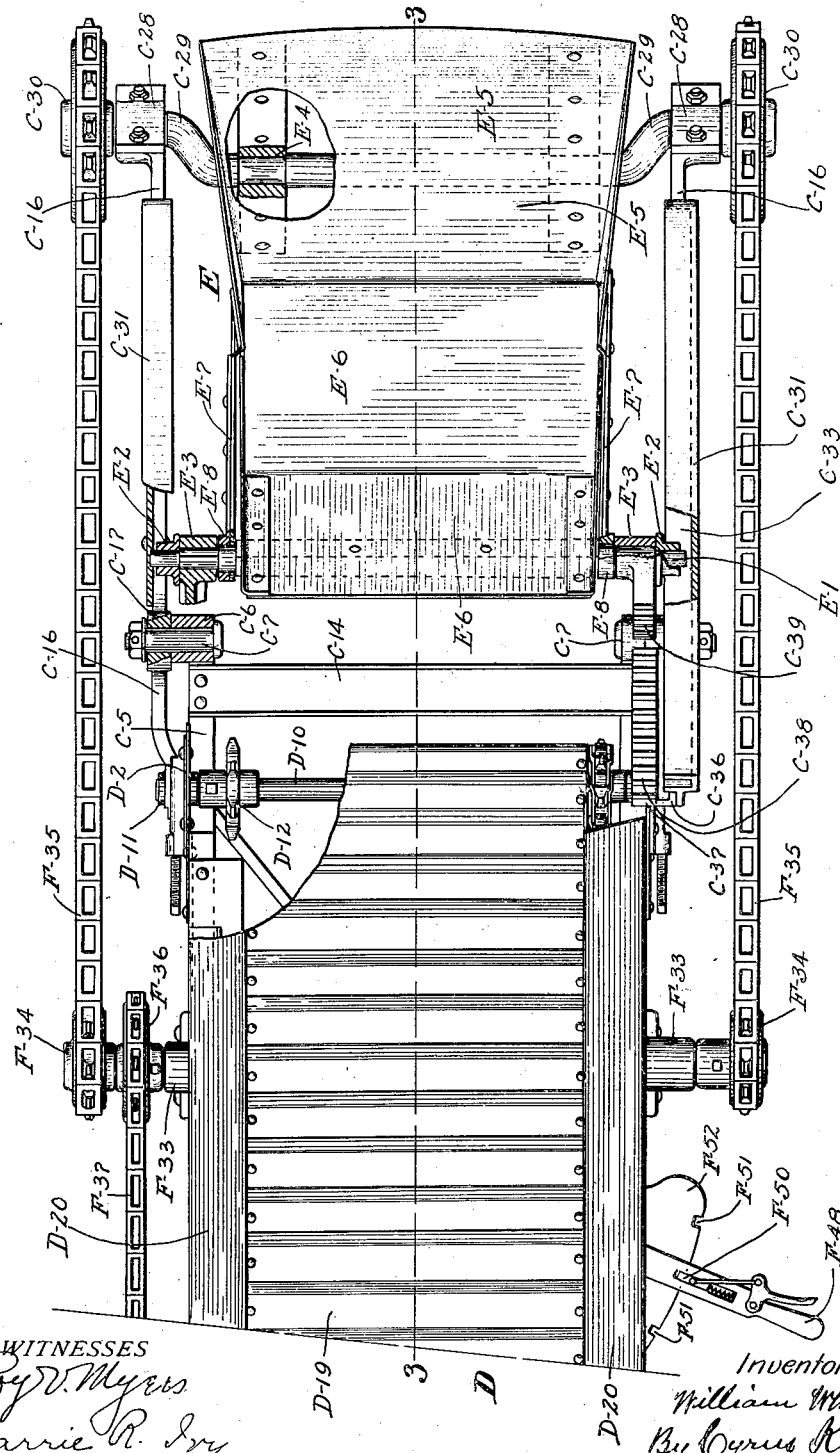

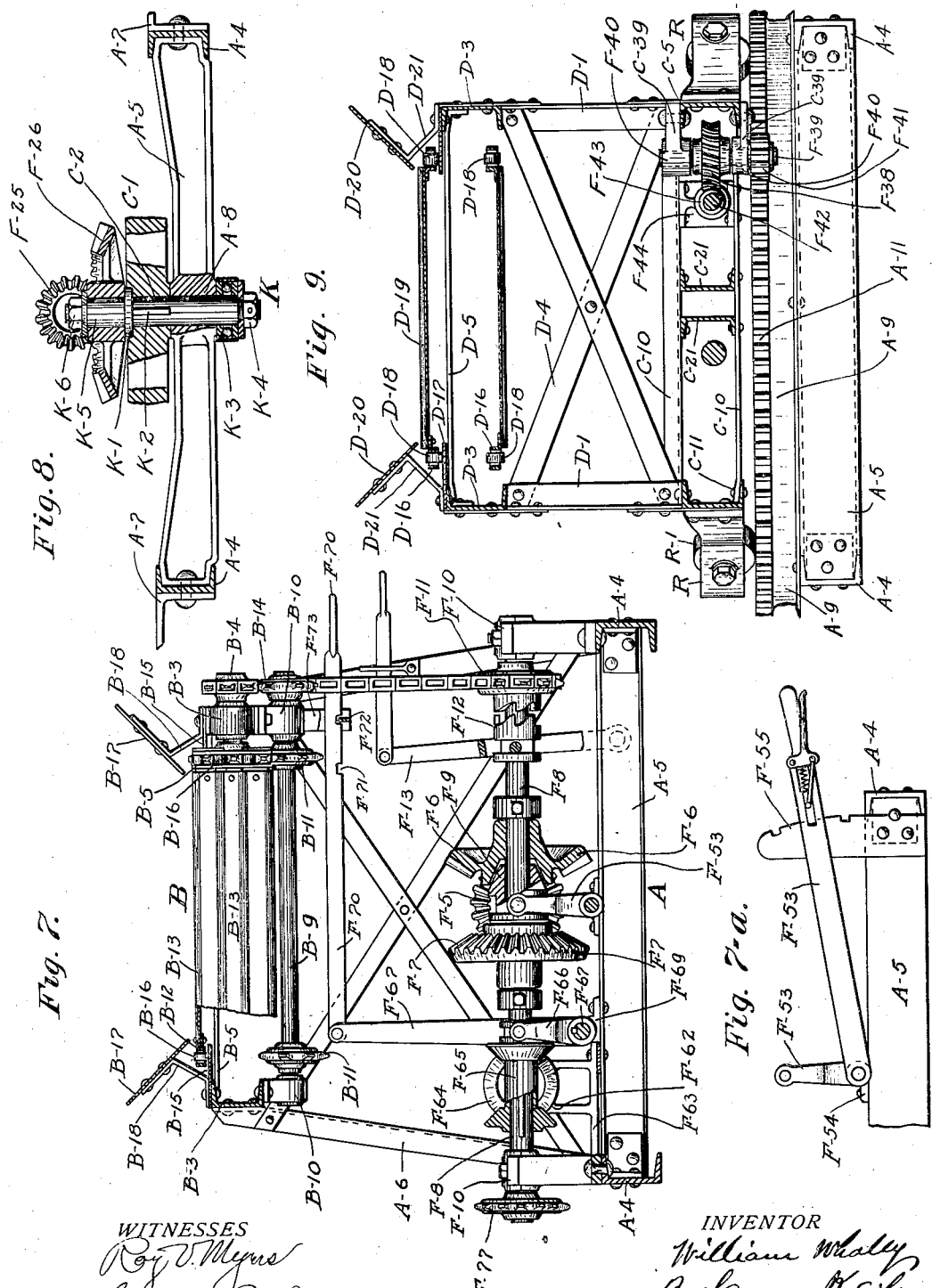

W. WHALEY.
SHOVELING MACHINE.
APPLICATION FILED JULY 1, 1907. RENEWED SEPT. 7, 1909.
940,999.
Patented Nov. 23, 1909.
10 SHEETS—SHEET 8.
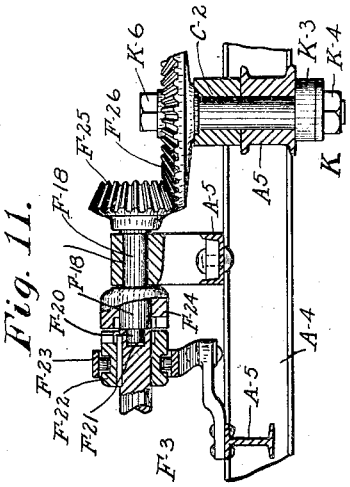
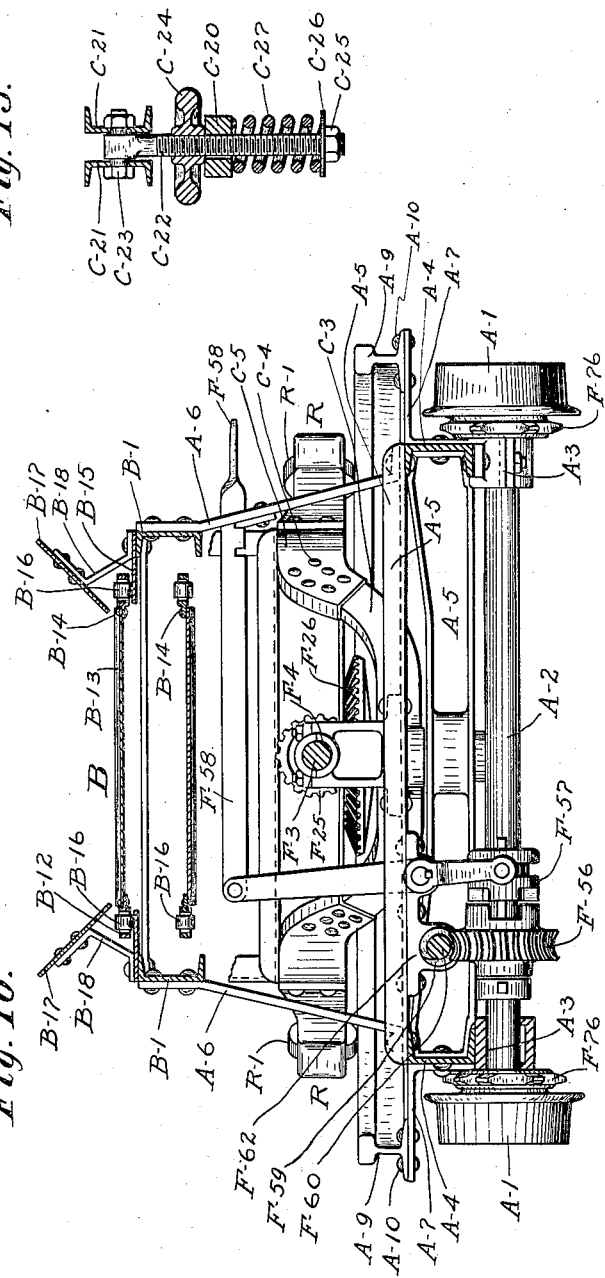
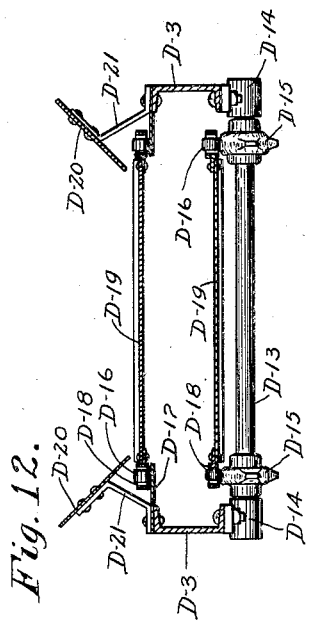
Witnesses.
Inventor.
William Whaley
By Cyrus K Eler
Attorney.

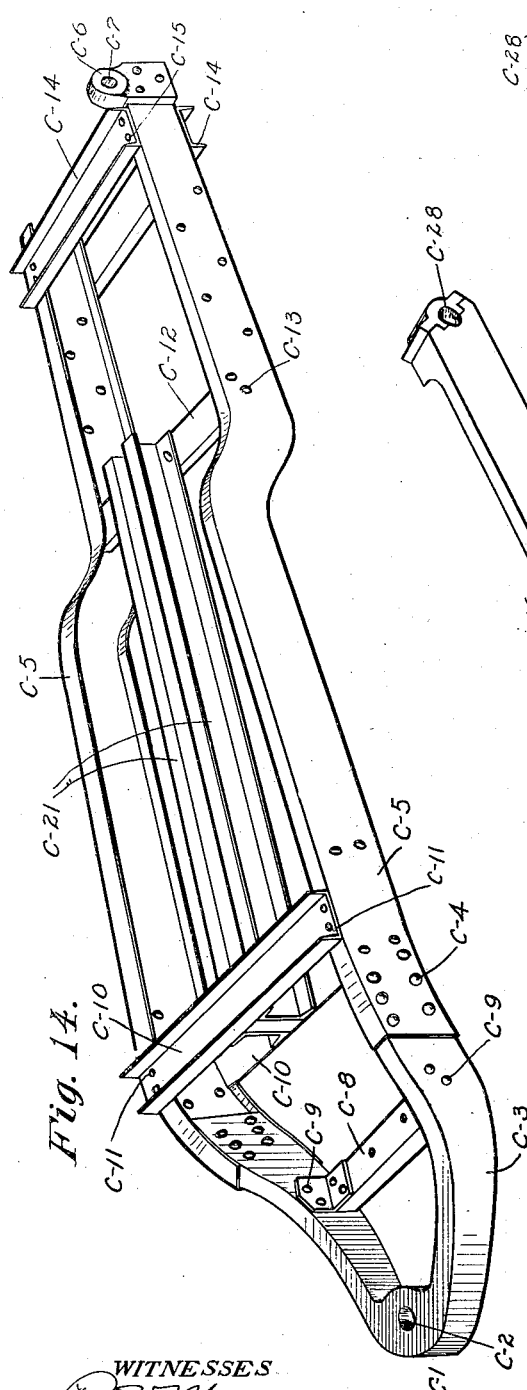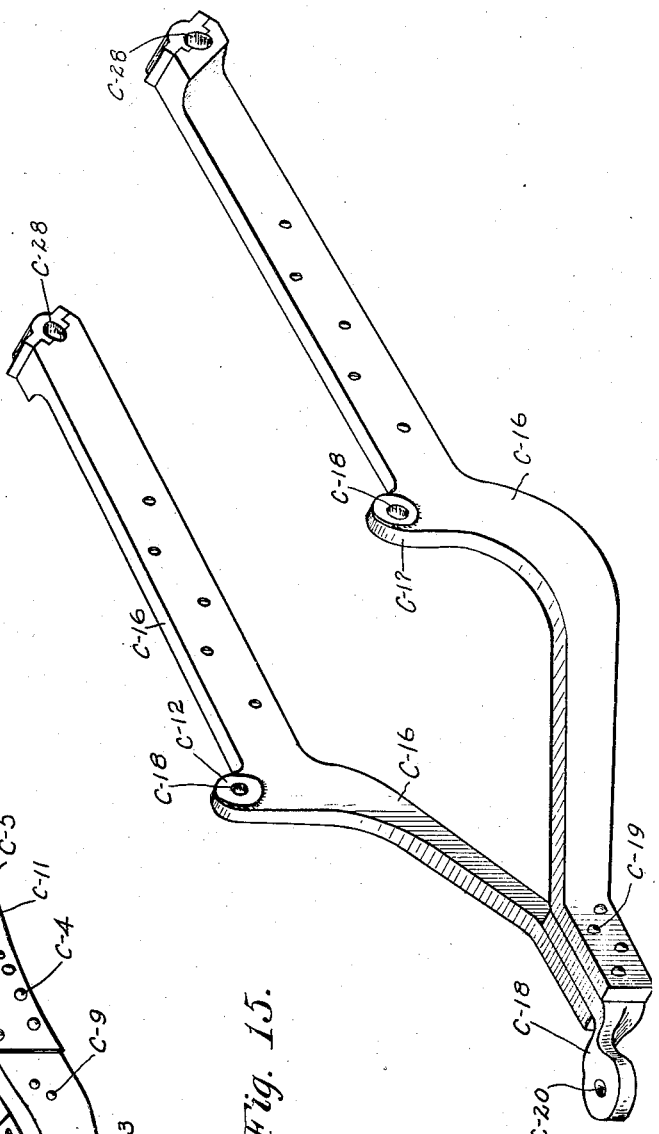

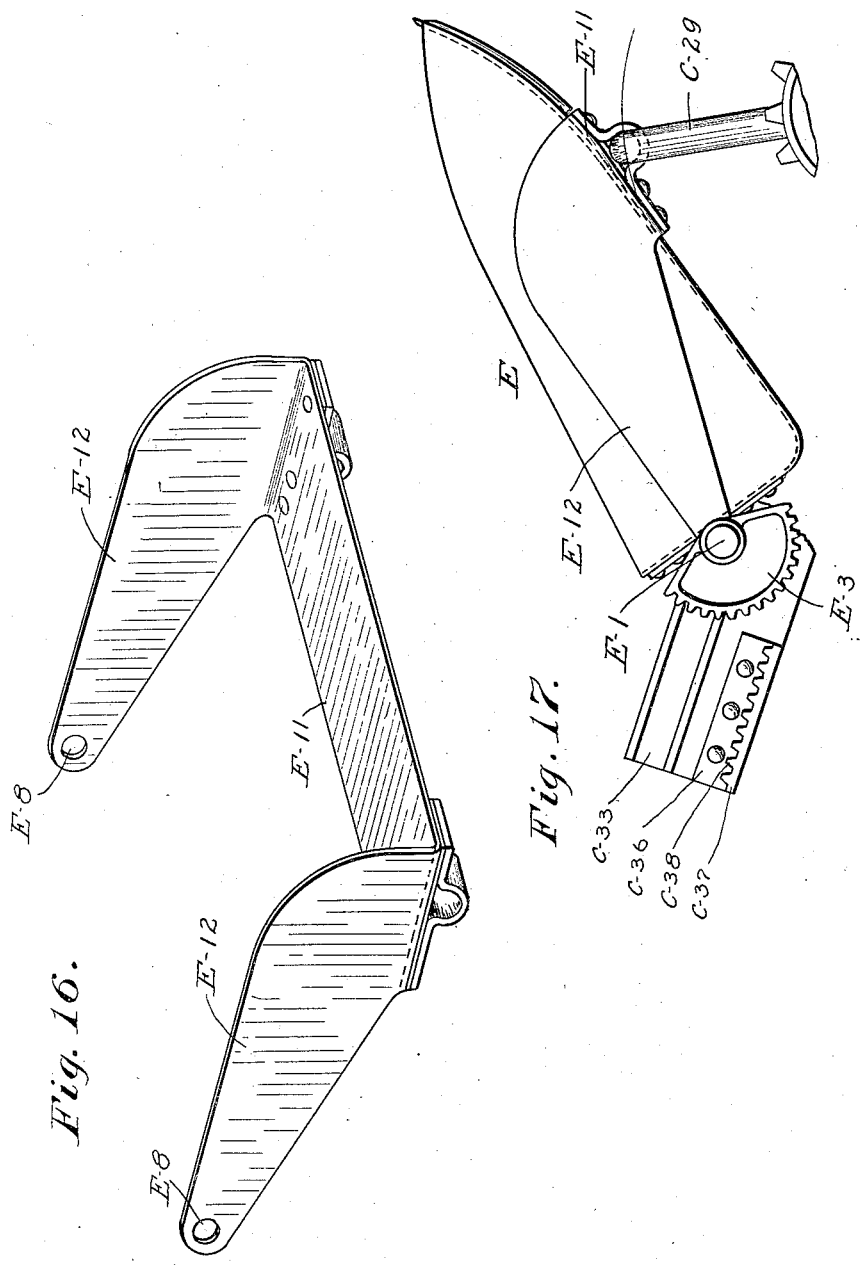

UNITED STATES PATENT OFFICE.

WILLIAM WHALEY, OF KNOXVILLE, TENNESSEE.

SHOVELING-MACHINE.

940,999.  Specification of Letters Patent.  Patented Nov. 23, 1909.

Application filed July 1, 1907, Serial No. 381,624. Renewed September 7, 1909. Serial No. 516,540.

*To all whom it may concern:*

Be it known that I, WILLIAM WHALEY, a citizen of the United States, residing at Knoxville, in the county of Knox and State of Tennessee, have invented a new and useful Improvement in Shoveling-Machines, of which the following is a specification, reference being had to the accompanying drawing.

My improvement relates particularly to mechanism for loading coal and other minerals in approximately horizontal mine workings in which the head room is so low that steam shovels and bucket elevators and similar machines can not be used. The machine is adapted to be used upon surfaces or tracks which are level or so nearly level as to permit the propulsion of the machine toward and from the material to be loaded. While the machine is primarily intended for use in such workings, it may also be used in open situations for the loading and digging of coal, ores, gravel, sand, earth, and other loose materials.

The improvement may be embodied in a variety of forms. In the particular form herein described, the invention is embodied in a machine comprising (1) a section which is, in effect, a low car having four wheels intended to rest upon light track rails; (2) an approximately horizontal, endless apron conveyer or carrier supported by said car; (3) a jib crane section pivotally mounted upon said car and projecting horizontally forward from the car; (4) an endless apron conveyer or carrier mounted upon said jib section in proper position to discharge upon the first mentioned apron, in whatever position the jib section may stand; (5) a shovel or scoop supported at the outer or free end of said jib section and so controlled as to move forward with its nose upon the floor or ground and take a load, lift the load and move it rearward and discharge it upon the second or forward conveyer. All these main parts and their accessories are arranged so as to make the entire structure low enough to enter a working with a low "roof". The machine of the accompanying drawings is proportioned approximately for a working in which the height from the floor to the roof is as low as four feet. Any suitable power is to be provided for operating said accessories and said shovel and turning said jib horizontally upon its upright axis, and propelling the car forward and backward upon the track. In the form illustrated by the drawings, an electric motor is mounted upon said car to furnish such power.

In the accompanying drawings, Figure 1 is a side elevation, portions being broken away; Fig. 2 is an enlarged elevation of the forward portion of the machine; Fig. 3 is a longitudinal upright section of the forward portion of the machine, taken on the line, 3—3, of Fig. 6, the scoop being, however, not in the same position; Fig. 4 is a plan of the machine, the two endless apron conveyers and certain other portions having been removed; Fig. 5 is a plan of a portion of the machine rearward of the line, 5—6, of Fig. 4, a few portions being broken away; Fig. 6 is a plan of the portion of the machine which is forward of the line, 5—6, as shown in Fig. 4, a few portions being broken away; Fig. 7 is a sectional elevation of the left hand end of the machine as shown in Fig. 1; Fig. 7ª is a detail elevation of the lever shown in the lower left hand portion of Fig. 1 and the left hand portion of Fig. 4, and cut away by the section shown in Fig. 7; Fig. 8 is a section on the line 8—8 of Fig. 4, looking toward the left; Fig. 9 is a section on the line 5—6 of Fig. 4, looking toward the left; Fig. 10 is a section on the line 10—10 of Fig. 5, looking toward the right; Fig. 11 is an upright sectional detail of the gearing surrounding the upright axis upon which the jib rotates, the section being parallel to the length of the machine and extending rearward from said jib axis; Fig. 12 is a transverse section of the forward or second endless apron conveyer, on the line 12—12 of Fig. 2; Fig. 13 is an upright sectional detail of the spring and accessories therefor shown at the lower left hand portion of Fig. 2; Fig. 14 is a perspective view of the jib frame; Fig. 15 is a perspective of the scoop-frame which forms the forward end of the jib-frame; Figs. 16 and 17 illustrate another form of the scoop.

Referring to said drawings, A designates the car; B designates the rear endless apron conveyer; C designates the horizontal swinging crane jib; D designates the endless apron conveyer supported by said jib; E designates the scoop or shovel; and F designates the electric motor.

In the form shown, the car has four wheels, $A^1$, secured rigidly to axles, $A^2$, resting in bearings, $A^3$, on the longitudinal side members, $A^4$, of the frame. Said side members are connected by several frame members, $A^5$. Upon the frame formed by said members, $A^4$ and $A^5$, are mounted all of the devices constituting the operative portions of the machine, including the jib. From the frame rise four posts, $A^6$, to support the conveyer, B, two of said posts being at one side and two at the other side of the car. At each side of the car, a plate or beam, $B^1$, of channel iron is secured to the upper ends of the two posts located at that side of the car. The left hand ends of said beams project leftward beyond the frame of the car as far as may be desired. At the opposite end, said beams extend almost to the opposite end of the car and to a lower level than at the left hand. At the left hand end, a shaft, $B^2$, extends from one beam to the other and rests in suitable bearings, $B^3$, in or on said beams. At its front end, said shaft projects through the bearing and supports a sprocket wheel, $B^4$. At the inner side of each beam, a sprocket wheel, $B^5$, surrounds and is immovably secured to the shaft. At the right hand end of said beams, a similar transverse shaft, $B^6$, rests in bearings, $B^7$. At the inner side of each beam, a sprocket wheel, $B^8$, surrounds said shaft. Directly above the left hand end of the car frame is a horizontal shaft, $B^9$, resting in bearings, $B^{10}$, secured to the lower portions of the beams, $B^1$ (see Fig. 7). Said shaft supports two idle sprocket wheels, $B^{11}$. Along the inner side of each beam, an endless sprocket chain, $B^{12}$, extends around the adjacent sprocket wheels, $B^5$ and $B^8$, and passes over the adjacent idle sprocket wheel, $B^{11}$. Upon said chain, $B^{12}$, are secured overlapping metal plates, $B^{13}$, one plate being secured to each link by bolts or rivets, $B^{14}$. Said chains and plates constitute the endless apron conveyer, B, and, as is obvious, said conveyer is supported by said shafts, $B^2$, $B^6$, and $B^9$. Said apron is further supported by flanges, $B^{15}$, extending horizontally beneath the edge of said apron from each beam, $B^1$, the apron sliding on said flanges, or, as shown, having anti-friction rollers, $B^{16}$, on the chain and bearing upon said flanges. Said apron is driven by power transmitted from the motor, F, by connections to be next described.

$F^1$ is the motor pinion meshing with the larger spur gear wheel, $F^2$, secured to the shaft, $F^3$, resting in bearings, $F^4$, secured to the frame of the motor. On the left hand end of said shaft, $F^3$, is a bevel gear, $F^5$, adapted to mesh at its front with a bevel gear, $F^6$, and at its rear with a similar bevel gear, $F^7$, said gears, $F^6$ and $F^7$, loosely surrounding a transverse shaft, $F^8$, and being adapted to be engaged by a friction clutch, $F^9$, keyed upon said shaft. Said shaft, $F^8$, rests in bearings, $F^{10}$, on the side frame pieces, $A^4$. At the inner side of the front side frame piece, $A^4$, said shaft, $F^8$, is loosely surrounded by a sprocket wheel, $F^{11}$, and beside said sprocket wheel is a toothed clutch, $F^{12}$, slidably surrounding said shaft, $F^8$, and controlled by a hand lever, $F^{13}$, (see Figs. 4, 5, and 7).

The front end of the shaft, $B^9$, projects through its bearing and is surrounded by an idle sprocket wheel, $F^{14}$; and a little way above and to the right of said wheel, $F^{14}$, another idle sprocket wheel, $F^{15}$, is supported upon a horizontal bracket, $F^{16}$, said bracket being supported by the adjacent beam, $B^1$.

An endless sprocket chain, $F^{17}$, surrounds the sprocket wheels, $F^{11}$ and $B^4$, and extends over the sprocket wheels, $F^{14}$ and $F^{15}$. Said chain might go directly from the lower wheel, $F^{11}$, to the upper sprocket wheel, $B^4$; but it is preferable to deflect said chain by means of the idle sprocket wheels, $F^{14}$ and $F^{15}$, in order to leave a clear space beneath the portion of the carrier or apron which projects beyond the car frame to make room for an ordinary mine car into which said carrier is to discharge.

Near the right hand end of the car, A, is a strong transverse frame member, $A^5$. (See Figs. 4, 5, and 8.) To the outer face of each side member, $A^4$, of the frame is applied a bracket, $A^7$. At the middle of said large transverse frame member, $A^5$, is an upright bearing, $A^8$. Concentric to said bearing and resting upon said brackets and the said members, $A^4$, and the transverse frame member, $A^5$, at the right of said large transverse member is a segmental track, $A^9$, secured to said bracket and said side members by bolts or rivets, $A^{10}$. The lateral, external face of said track is provided with gear teeth, $A^{11}$. Said track and said large transverse member, $A^5$, form a support for the jib, which will be next described. Said jib has a frame comprising a V-shape hub-piece, $C^1$, having an opening, $C^2$, and having arms, $C^3$, the outer ends of which rise somewhat. (For details, see Figs. 10 and 14.) To each of said arms is secured by bolts or rivets, $C^4$, a frame side rail, $C^5$. At the right hand end of each of said side rails is secured a short standard, $C^6$, the lower end of said standard overlapping the side of said rail and the upper end of said standard bearing a horizontal wrist or journal, $C^7$, (Fig. 6) extending toward the opposite side rail, $C^5$, and directed outward. (One of said standards is omitted in Fig. 14.) Said arms, $C^3$, are joined by a transverse horizontal frame-piece, $C^8$, joined to said arms by bolts or rivets, $C^9$. The adjacent ends of the side rails, $C^5$, are similarly joined to each other by two horizontal transverse frame members, $C^{10}$, one being located above the other and both being secured by bolts or rivets, $C^{11}$. (Figs. 9 and 14.) Nearly midway between the ends of said side rails, a transverse frame member, $C^{12}$, extends from one of said side rails to the other and is joined thereto by bolts or rivets, $C^{13}$. At the right hand ends of said side rails, $C^5$, are two transverse frame pieces, $C^{14}$, extending from one of said rails to the other and joined thereto by bolts or rivets, $C^{15}$, one of said members resting upon said side rails and the other being applied to the lower faces of said side rails. In each pair of such transverse frame pieces or members, the pieces have a space between them which is utilized as will hereinafter appear.

An upright king-bolt, K, extends through the opening, $C^2$, in the jib frame and through the bearing, $A^8$, in the frame-piece, $A^5$, of the car. Said king-bolt extends above the opening, $C^2$, and at the upper portion of said opening it has an annular collar or shoulder, $K^1$. (Figs. 8 and 11.) Said bolt is made non-rotatable in the opening, $C^2$, by means of a key, $K^2$. Below said frame-piece, $A^5$, washers, $K^3$, and a nut, $K^4$, are applied to said king-bolt. Above the collar, $K^1$, said king-bolt is loosely surrounded by a bevel gear wheel, $F^{26}$, the function and connections of which will be hereinafter described. Above said bevel gear wheel, a washer, $K^5$, and a nut, $K^6$, are applied to said bolt.

At each side of the jib frame and directly above the segmental track, $A^9$, a bracket, R, is secured to the adjacent side rail of said frame, and in said bracket is journaled a roller, $R^1$, resting upon said segmental track. Said rollers and said king-bolt form the supports for said jib-frame, and the axis of said king-bolt is the axis of rotation of said jib-frame.

To the jib frame thus described is applied a supplemental scoop frame (Figs. 15, 6, and 2) comprising two side pieces, $C^{16}$, having between their ends upright ears, $C^{17}$, in which are bearings, $C^{18}$, in which rest the wrists or journals, $C^7$, which have been described as being supported by the right hand or free ends of the side rails, $C^5$, of the jib frame. Said scoop frame side pieces extend downward from said ears and then toward each other beneath the main portion of the jib frame until they meet each other and extend thence horizontally side by side toward the middle of the transverse frame piece, $C^{10}$. The left hand ends of said pieces extend along opposite sides of an eye-piece, $C^{18}$, and are secured to said eye-piece by means of bolts or rivets, $C^{19}$. Said eye-piece has an upright eye, $C^{20}$. Extending from the transverse jib frame pieces, $C^{10}$, to the transverse jib frame pieces, $C^{12}$, are two parallel longitudinal bars or frame pieces, $C^{21}$, located equi-distant from the middle longitudinal line of said frame, the ends of said frame pieces, $C^{21}$, resting between the transverse pieces, $C^{10}$ and $C^{12}$. Directly above the eye, $C^{20}$, of the eye-piece, $C^{18}$, an eye-bolt, $C^{22}$, is hung between said longitudinal frame pieces, $C^{21}$, by means of a bolt or pin, $C^{23}$, passing horizontally through said pieces, $C^{21}$, and the eye of said bolt. (See Figs. 2, 4, and 13.) And said eye-bolt passes through said eye, $C^{20}$. Above said eye, $C^{20}$, said eye-bolt is surrounded by a hand-wheel nut, $C^{24}$, which may be raised and lowered, by turning upon said eye-bolt to vary the height to which the eye-piece, $C^{18}$, and the adjacent ends of the side pieces, $C^{16}$, may rise. Below said eye, $C^{20}$, said eye-bolt bears a nut, $C^{25}$, and upon said nut rests a washer, $C^{26}$, and upon said washer rests an expanding coiled spring, $C^{27}$. Said spring bears against the eye-piece, $C^{18}$, and normally presses the latter upward against the hand-wheel nut, $C^{24}$; but, under sufficient strain (as when the scoop bears against a rise in the floor) said spring yields and allows said eye-piece, $C^{20}$, and the adjacent ends of the scoop-frame side-pieces, $C^{16}$, to descend and the right hand ends of said side pieces to correspondingly rise. The resistance of said spring may be varied by raising or lowering the nut, $C^{25}$.

On the right hand end of each scoop frame side piece, $C^{16}$, is a horizontal transverse bearing, $C^{28}$, in which rest the ends of a crank shaft, $C^{29}$, to which is applied one end of the scoop or shovel, E, as will be hereinafter described. Each end of said crank shaft projects through the adjacent bearing, $C^{28}$, and bears a sprocket wheel, $C^{30}$, keyed to said shaft. Between said bearings, $C^{28}$, and the ears, $C^{17}$, a cam plate, $C^{31}$, is secured to each side piece, $C^{16}$. Each of said cam plates overlaps the outer face of the adjacent side piece, $C^{16}$, and is secured to the latter by bolts or rivets, $C^{32}$. Along the upper portion of the inner face of each of said cam plates is a cam groove, $C^{33}$, in which slidably rest the ends of a horizontal transverse bar, $E^1$. The ends of said bar are shown surrounded by an antifriction roller, $E^2$. Said bar, $E^1$, supports the rear end of the scoop or shovel, as will be hereinafter described. Said cam plate, $C^{31}$, extends obliquely upward and toward the main portion of the jib; and beneath the upper end of said groove, $C^{33}$, a rack plate, $C^{36}$, is secured to said cam-plate, $C^{31}$, said rack-plate having at its outer edge an inward-directed flange, $C^{37}$, bearing upon its upper face gear teeth, $C^{38}$, adapted to be engaged by segment gears, $E^3$, which are secured to the bar, $E^1$, between the rollers, $E^2$, and the adjacent sides of the scoop, said segment gears being keyed or otherwise immovably secured to said bar, $E^1$. (Figs. 3 and 6.)

A little way rearward of the nose of the scoop or shovel, E, is a bearing, E⁴, in which rests the crank shaft.

The scoop is composed of a forward section, E⁵, and a rear section, E⁶. The forward section has at each side a rearward extension, E⁷, terminating in a bearing, E⁸, loosely surrounding the bar, E¹, so that said forward section, E⁵, is journaled to said crank shaft, C²⁹, by means of the bearings, E⁴, and also to said bar, E¹, and must adapt itself to the movements of said crank and said bar, as will be hereinafter described. The rear section, E⁶, of said scoop rests between the rearward extensions, E⁷, of the forward section and is immovably secured to said bar, E¹, and the forward portion of said rear section rests loosely within the rear portion of said forward section, E⁵, so that, by the rotation of the bar, E¹, contra-clockwise, as viewed in Figs. 2 and 3, said section, E⁶, may turn or tilt with said bar (on an axis which is horizontal and transverse to the length of the machine), the forward end of said section being lifted out of the section, E⁵.

The movement of the forward portion or nose of the scoop section, E⁵, is controlled by the crank shaft, C²⁹. Said crank shaft is rotated contra-clockwise as viewed in Figs. 2 and 3, or in the direction of the arrow shown in said figures. The movement of the rear end of said forward scoop section is controlled by the cam grooves, C³³, the transverse bar, E¹, as above described, sliding in said grooves. Hence it will be observed that the nose of said forward scoop section will travel in a relatively large orbit while its rear end merely reciprocates in a path which is nearly straight and approximately horizontal. In other words, said forward scoop section is moved nearly like an ordinary pitman attached to an ordinary crank, the movement in the present case being modified by the irregularity of the cam grooves. And said forward section turns or tilts (not so far as the rear section) on the bar, E¹, or on an axis which is horizontal and transverse to the length of the machine.

When during its descent, the nose of the scoop reaches the floor, it is desirable that said nose move forward horizontally or in a plane parallel to the floor until the forward section of the scoop is filled with the material to be loaded. This parallel or horizontal movement of said nose is attained by lowering the rear end of the scoop during the interval of forward movement needed for the filling of said forward section. Such lowering of the rear end of the scoop is attained by lowering or inclining the portion of the cam groove, C³³, which is forward of the bar, E¹, when the nose of the scoop reaches the floor, and continuing such inclination as far as said bar has to travel before said forward section of the scoop begins to lift its load. The load thus taken by the forward section of the scoop is to be transferred from said section into the rear scoop section, and then transferred by the latter to the forward endless apron carrier, D. For making such transfer of said load from the forward scoop section to the rear scoop section, the scoop is tilted, the nose rising higher and higher while the rear portion remains at approximately the same level. The nose of the scoop is to be thus raised sufficiently to cause its load to slide rearward and downward into the rear scoop section. Said position is attained when the crank shaft, C²⁹, is in the position shown by dotted lines in Fig. 3, the bar, E¹, then resting in the lowest portion of the cam grooves, C³³. The load being now in the rear scoop section, the further movement of the crank shaft moves the entire scoop rearward until the segment gears, E³, engage the rack teeth, C³⁸, whereupon said segment gears are rotated contra-clockwise as viewed in Fig. 3, whereby the rear scoop section revolves partially around the bar, E¹, until it becomes inverted to such extent as to discharge its load by gravity upon the apron carrier, D. But the rapidity of such movement of the rear scoop section may be varied by varying the size of the segment gear, E³. If so desired, such movement may be made sufficiently rapid to cause the throwing of said load forcibly rearward upon and over the carrier, D, instead of permitting it to slide out of said scoop section by gravity. When the crank shaft has turned rearward to its limit, said forward section and said bar, E¹, cease rearward movement and begin a forward movement, whereupon the segment gear, E³, reverses its movement and causes a reverse movement of the bar, E¹, and such reverse movement of said bar causes the rear scoop section to revolve in the forward direction until said segment gear is disengaged from the gear teeth, C³⁸. This occurs when the forward scoop section is already well down toward the floor and the rear scoop section has to turn approximately 60 degrees to attain its normal position of rest in the forward section. Through such arc, said rear section falls by gravity.

To bring the upper faces of the bottom portions of the front and rear scoop sections flush with each other when the rear section is in its normal position, the rear edge of the floor of the forward section has a downward off-set portion, E⁹, upon which the front edge of the floor of the rear section rests, said off-set being at least equal to the thickness of the front edge of the floor of said rear section. The drawings show said off-set low enough to support a cushion, E¹⁰, of rubber or other suitable elastic material and yet leave the upper face of the rear section floor flush with the upper face of the front section floor. The purpose of said elastic member, $E^{10}$, is to absorb the shock of the return of the rear scoop section when it falls into its normal position, as above described.

In situations affording sufficient head room, the scoop may be in the form shown in Figs. 16 and 17. In said form, the front and rear scoop sections hereinbefore described are merged into a single section, E, of approximately the size of said two sections; and a stirrup-like frame comprising a transverse piece, $E^{11}$, secured to the crank, $C^{29}$, and rearward extensions, $E^{12}$, corresponding to the rearward extensions, $E^{12}$, of the previous form, forms a rest for the forward portion of said scoop, the rear portion of the scoop of this second form being secured to the bar, $E^1$, to which the rear section of the preceding form of the scoop is secured. When this scoop moves rearward until the segment gear, $E^3$, engages its rack, the entire scoop is tilted backward (on a horizontal, transverse axis) and its load discharged upon the conveyer. More head room is needed for this movement than for the same movement for the rear section, $E^6$.

In both of the above described forms, the scoop is moved forward in position to take a load and the front portion of the scoop is then raised more and more whereby the scoop is turned or tilted on an axis which is horizontal and transverse to the length of the machine. And in each case the scoop is also given a bodily rearward movement after it has taken its load. The tilting for the discharge of the load might be forward.

The endless apron carrier, D, will be next described, after which the manner of applying power for operating the scoop and said carrier will be described.

Adjacent to the transverse frame piece, $C^{10}$, of the jib, C, are two upright standards, $D^1$, one rising from each of the two side rails, $C^5$, of the jib frame; and a little way rearward of each ear, $C^{17}$, is a relatively lower standard, $D^2$, one such standard rising from each side rail, $C^5$. The front of said standards, $D^1$ and $D^2$, support a front carrier frame rail, $D^3$, and the rear standards, $D^1$ and $D^2$, support a similar carrier rail, $D^3$. Said carrier rails are parallel to each other and their respective ends are at the same elevations. Said standards, $D^1$, are joined by oblique brace bars, $D^4$, as shown in Fig. 9; and the upper ends of the carrier side rails, $D^3$, are joined by a transverse horizontal bar, $D^5$. The standards, $D^2$, being close to the side rails, $C^5$, are sufficiently stable to render it unnecessary to join the lower ends of the side rails, $D^3$, by cross-bars. At the upper ends of the carrier rails, $D^3$, is a transverse horizontal shaft, $D^6$, resting in bearings, $D^7$, and bearing adjacent the inner face of each of said rails a sprocket wheel, $D^8$, keyed to said shaft. At its rear end, said shaft projects beyond the adjacent bearing, $D^7$, and is surrounded by a sprocket wheel, $D^9$, secured immovably to said shaft. At the lower ends of said side rails, is a transverse horizontal shaft, $D^{10}$, resting in bearings, $D^{11}$. Adjacent the inner face of each of said side rails, a sprocket wheel, $D^{12}$, surrounds said shaft, $D^{10}$, loosely or otherwise, said shaft and said sprocket wheels being turned idly by the apron, as will be hereinafter described. About midway between the ends of said side rails is a transverse shaft, $D^{13}$, resting in bearings, $D^{14}$, extending downward from said side rails; and adjacent the inner face of each of said rails said shaft is surrounded by a sprocket wheel, $D^{15}$. Adjacent the inner face of each of said side rails is an endless sprocket chain, $D^{16}$, surrounding the adjacent sprocket wheels, $D^8$ and $D^{12}$, and extending over the adjacent sprocket wheel, $D^{15}$. And the upper portion of each of said chains is supported also by a horizontal flange plate, $D^{17}$, said chain resting slidably upon said plates. Each link of the chain may have a roller, $D^{18}$, bearing upon said plates. Upon said chains, extending from one to the other, are overlapping apron plates, $D^{19}$. At each side of the apron are inclined stationary side plates, $D^{20}$, supported by short standards, $D^{21}$, rising from the side rails, $D^3$. Said side plates and said apron together form a trough or conductor, the apron constituting a movable bottom for the trough or conductor.

In some situations only a single conveyer or conductor of any desired form may be used for receiving and conveying or conducting the material from the scoop.

Turning now to the mechanism for transmitting power to the jib, the scoop, and the carrier, D, attention is directed to Figs. 1, 5, 6, and 11. Axially in line with the shaft, $F^3$, is a short shaft, $F^{18}$, resting in a bearing, $F^{19}$, supported upon the adjacent transverse frame member, $A^5$. Said shaft preferably abuts against the shaft, $F^3$, and, for the sake of greater stability, said shafts should interengage each other by means of a cylindrical neck, $F^{20}$, and a corresponding socket, $F^{21}$. Upon one of said shafts (the drawing shows it the shaft $F^3$) is a sliding member of a toothed clutch, $F^{22}$, controlled by a hand lever, $F^{23}$, while the other shaft has upon its adjacent end the other or fixed member, $F^{24}$. By throwing said sliding member, $F^{22}$, into engagement with the clutch member, $F^{24}$, rotation is imparted to said short shaft, $F^{18}$. On the opposite end of said shaft, $F^{18}$, is a bevel gear wheel, $F^{25}$, which meshes with a relatively larger horizontal bevel gear wheel, $F^{26}$, which loosely surrounds the king-bolt, K. Also meshing with said bevel gear wheel, $F^{26}$, is another bevel gear wheel, $F^{27}$, fixed upon one end of a horizontal shaft, $F^{28}$, resting in bearings, $F^{29}$. The opposite end of said shaft projects beyond the right hand or forward bearing and is surrounded by a bevel gear wheel, $F^{30}$, which meshes with a similar bevel gear wheel, $F^{31}$, fixed upon a horizontal transverse shaft, $F^{32}$, resting in bearings, $F^{33}$, on the side rails, $C^5$, of the jib frame. Each end of said shaft, $F^{32}$, projects outward beyond its bearing and is surrounded by a sprocket wheel, $F^{34}$, immovably secured to said shaft. At each side of the machine, a sprocket chain, $F^{35}$, extends around the adjacent sprocket wheels, $F^{34}$ and $C^{30}$, on the scoop crank shaft, $C^{29}$. Through the train of gears and gear shafts and said chains, as thus described, power is transmitted to said scoop-shaft, $C^{29}$, and the scoop is thereby actuated or caused to travel through its irregular orbit. It is to be observed that the sprocket chain and the sprocket wheels upon which it is mounted, at one side of the jib may be omitted, but I deem it preferable to balance the transmission by the use of the two chains and use a lighter crank-shaft and lighter chains.

Between the rear sprocket wheel, $F^{34}$, on the shaft, $F^{32}$, and the adjacent bearing, $F^{33}$, a sprocket wheel, $F^{36}$, surrounds said shaft and is immovably secured thereto. An endless sprocket chain, $F^{37}$, surrounds said sprocket wheel, $F^{36}$, and the sprocket wheel, $D^9$, on the shaft, $D^6$, at the upper end of the carrier, D, and through such chain, motion is imparted to the apron of said carrier.

On the rear side rail, $C^5$, of the jib frame are two horizontal brackets, $C^{39}$, between which is located a worm gear, $F^{38}$, said worm gear being fixed upon a short upright shaft, $F^{39}$, resting in bearings, $F^{40}$, on said brackets. The lower end of said shaft projects below the lower bearing, $F^{40}$, and supports a gear pinion, $F^{41}$, which meshes with the gear teeth, $A^{11}$, on the segment track, $A^9$. The horizontal shaft, $F^{42}$, bears a worm, $F^{43}$, meshing with said worm gear, $F^{38}$, and is journaled in a bearing, $F^{44}$, on the transverse frame piece, $C^{10}$, on the jib frame and in a bearing, $F^{45}$, on the transverse frame piece, $C^{12}$, of the jib frame. The adjacent end of said shaft extends beyond said bearing and bears a bevel friction wheel, $F^{46}$, which extends between the bevel faces of a sliding friction gear member, $F^{47}$, on the shaft, $F^{32}$, keyed slidably to said shaft. By shifting said gear member longitudinally upon its shaft, it is made to engage one or the other of its faces with the bevel wheel, $F^{46}$, and rotate the latter and the shaft, $F^{42}$, in one direction or the other, whereby the worm gear, $F^{38}$, and the pinion, $F^{41}$, are correspondingly rotated and the jib made to creep on the segment track, $A^9$, the king-bolt, K, being the axis of such movement.

The friction gear member, $F^{47}$, is controlled by a horizontal hand lever, $F^{48}$, having one end coupled to said member and being hinged at $F^{49}$, to the longitudinal frame piece, $C^{21}$. At its outer end, said hand lever has a slide bolt, $F^{50}$, adapted to engage in one of three notches, $F^{51}$, on a rack-plate, $F^{52}$, mounted upon the front side rail, $C^5$, of the jib frame. By setting said lever on the middle notch, $F^{51}$, the friction gear member, $F^{47}$, is put out of engagement with the gear bevel, $F^{46}$, as shown in Fig. 4; and by setting said lever on one or the other of said notches, said member, $F^{47}$, is put into engagement with one side or the other of said bevel friction gear.

In addition to means for applying power for actuating the scoop, the two carriers, and the jib, such a machine should be provided with means for slowly moving the entire structure forward as may be required to bring the scoop within reach of the material to be loaded. Such means are shown in the drawing in operative relation with the electric motor, F. It is also desirable to embody in the same machine means for readily propelling the entire structure from one loading place to another or to any place for storing the machine while it is not in use. The drawings show such means also arranged in operative relation with the electric motor, F. The bevel gears, $F^6$ and $F^7$, are loose on the shaft, $F^8$, (see left hand portion of Fig. 4, also lower portion of Fig. 7); and between said bevel gears is the friction clutch, $F^9$, as already herein described, for the engagement of one or the other of said bevel gears. Said clutch is controlled by an angle lever, $F^{53}$, journaled in a bearing, $F^{54}$, and arranged to engage a rack plate, $F^{55}$. Normally said clutch is so set as to impart motion to the carrier, B, in the proper direction, and the teeth of the clutch, $F^{12}$, are so inclined as to remain in engagement when the clutch, $F^9$, is so set, but to automatically disengage when the clutch, $F^9$, is set in its other position and thus avoid reversing the carrier, B. On the rear portion of the left hand car axle, $A^2$, is a worm gear wheel, $F^{56}$ (Figs. 4 and 10). Said wheel is loose on said axle and adapted to be engaged by the toothed clutch, $F^{57}$, slidably surrounding said axle in front of said wheel. Said clutch is controlled by a hand lever, $F^{58}$. In engagement with the worm gear wheel, $F^{56}$, is a worm, $F^{59}$, on a slightly inclined shaft, $F^{60}$, resting in a bearing, $F^{61}$, secured to the under side of the adjacent transverse frame member, $A^5$, and in a bearing, $F^{62}$, on a short transverse frame piece, $F^{63}$. Said shaft projects beyond said bearing and supports a bevel gear, $F^{64}$, extending between the bevel faces of the gear member, $F^{65}$, keyed slidably upon the shaft, $F^8$, and controlled by a fork, $F^{66}$, rising from a crank shaft, $F^{67}$, resting in bearings, $F^{68}$ and $F^{69}$, and coupled with a reciprocatory hand lever, $F^{70}$. Said hand lever has three notches, $F^{71}$, in its lower edges for engagement in three positions on a cross-piece, $F^{72}$, supported by two hanger pieces, $F^{73}$, extending downward from the front side beam, $B^1$, of the carrier, B, at each side of said lever. By means of said bevel gears and said worm gear, the entire machine may be slowly moved upon its track, continually or at intervals at the will of the operator. The velocity should, of course, be proportioned to the work done by the scoop, E. And it is to be observed that the worm gear constitutes an effective locking means for preventing the idle moving of the car or its backward movement when the scoop is pushed against the material to be loaded. The effectiveness of such locking is enhanced by applying a sprocket chain, $F^{74}$, from the front end of one axle, $A^2$, to the corresponding end of the other axle, $A^2$, said chain surrounding a sprocket wheel, $F^{75}$, secured to each of the wheels, $A^1$. On the rear end of the left hand track wheel, $A^1$, is a similar sprocket wheel, $F^{76}$, and on the rear end of the power shaft, $F^8$, is a sprocket wheel, $F^{77}$; and a sprocket chain, $F^{78}$, surrounds said two sprocket wheels. Said chain is made separable at any desired point and in any desired manner, in order that it may be readily applied and removed. Normally it is removed from said wheels. It is to be used only when the entire machine is to be moved to a new location. The velocity of the shaft, $F^8$, is high enough to cause the propelling of the car at a speed which is considerably greater than the slow speed transmitted through the worm gears, $F^{56}$ and $F^{59}$.

By way of review, the operation may be briefly stated as follows: In coal mines, for which this loading machine is specially designed, there is usually a main, approximately-horizontal shaft called the "entry". This is ordinarily 8 to 14 feet wide. From said entry are entrances to "rooms", such entrances being also 8 to 14 feet wide— merely wide enough for the convenient passage of coal cars. The rooms beyond said entrances are ordinarily from 20 to 40 feet wide, according to physical conditions, and are sometimes made as large as 200 to 300 feet long. In the forming of such a room, the coal is removed through the entrance, the room growing longer and longer as the work progresses. The coal is either blasted from the solid mass with heavy charges of explosive, or by means of cutting machines, or hand picks, the seam of coal is under-cut and then broken down by hand or by blasting, if it does not fall of its own weight. Heretofore such fallen coal has been shoveled into cars by hand, and such operation has been tedious and expensive. The purpose of my machine is to follow such breaking down and load said coal into cars brought to the rear of the machine, beneath the rear and upper carrier, B, said cars standing on the same track as is used for supporting and guiding the loading machine. As already described, the electric motor is to slowly propel the machine forward at the will of the operator while the loading is being carried on, and the locking action of the worm gear used for such propulsion prevents back movement when the shovel or scoop is being pushed beneath the coal. The purpose of the lateral movement of the jib is to enable the shovel to reach across as much of the width of the room as possible. A single track will be enough, under ordinary conditions, to enable the scoop to reach entirely across a room twenty feet wide, the track being in the center of the room. If a room is wider, the track must be shifted to properly shift the machine, or, as is customary in many mines, two tracks can be run up each room and thereby facilitate the reach of the machine. The scoop frame, comprising the side pieces, $C^{16}$, hinged at $C^7$, is made yielding on said hinge, in order to adapt the nose of the scoop to pass automatically over irregularities in the floor. And said construction also provides for the manual adjustment of the elevation of the nose of the scoop when it is at its lowermost limit, the hand-wheel screw, $C^{24}$, and nut, $C^{25}$, being used for this purpose. Such adjustment is particularly desirable when tracks are laid with rails or ties of varying height. In the same way, a manual adjustment of the shovel may be made for a dip or rise in the floor preceding the track.

I claim as my invention:

1. In a machine of the nature described, a scoop, conducting mechanism behind said scoop, and mechanism for moving the scoop in an orbit which is upright and parallel to the length of the machine for the taking of a load and discharging it to said conducting mechanism, substantially as described.

2. In a machine of the nature described, a scoop, conducting mechanism behind said scoop, mechanism for moving the scoop in an orbit which is upright and parallel to the length of the machine for the taking of a load and discharging it to said conducting mechanism, and mechanism for slowly moving the machine forward, substantially as described.

3. In a machine of the nature described, a scoop, a forked support for said scoop, conducting mechanism behind said scoop, and mechanism for moving the scoop in an orbit which is upright and parallel to the length of the machine for the taking of a load and discharging it to said conducting mechanism, substantially as described.

4. In a machine of the nature described, a scoop, a laterally movable support for said scoop, conducting mechanism behind said scoop, and mechanism for moving the scoop in an orbit which is upright and parallel to the length of the machine for the taking of a load and discharging it to said conducting mechanism, substantially as described.

5. In a machine of the nature described, a scoop, a laterally movable support for said scoop, conducting mechanism behind said scoop, mechanism for moving the scoop in an orbit which is upright and parallel to the length of the machine for the taking of a load and discharging it to said conducting mechanism, and mechanism for slowly moving the machine forward, substantially as described.

6. In a machine of the nature described, a scoop, conducting mechanism behind and near the scoop, and mechanism for moving said scoop forward with its forward portion in position to take a load and then raising the scoop and discharging its load backward upon said conducting mechanism, substantially as described.

7. In a machine of the nature described, a scoop, conducting mechanism behind and near the scoop, mechanism for moving said scoop forward with its forward portion in position to take a load and then moving the scoop upward and backward and discharging its load backward upon said conducting mechanism, substantially as described.

8. In a machine of the nature described, wheels supporting said machine, a scoop, conveying mechanism behind and near said scoop, and mechanism for moving said scoop forward with its forward portion in position to take a load and then raising the scoop and discharging its load backward upon said conveying mechanism, substantially as described.

9. In a machine of the nature described, wheels supporting said machine, a scoop, conveying mechanism behind and near the scoop, mechanism for moving said scoop forward with its forward portion in position to take a load and then moving the scoop upward and backward and discharging its load backward upon said conveying mechanism, substantially as described.

10. In a machine of the nature described, a scoop, conveying mechanism behind and near the scoop, mechanism for moving said scoop forward with its forward portion in position to take a load and then raising the scoop and discharging its load backward upon said conveying mechanism, and mechanism for slowly moving said machine forward, substantially as described.

11. In a machine of the nature described, a scoop, conveying mechanism behind the scoop, mechanism for moving said scoop forward with its forward portion in position to take a load and then moving the scoop upward and backward and discharging its load backward upon said conveying mechanism, and mechanism for slowly moving said machine forward, substantially as described.

12. In a machine of the nature described, a jib, a scoop supported by said jib, conveying mechanism behind and near the scoop, and mechanism for moving said scoop forward with its forward portion in position to take a load and then raising the scoop and discharging its load backward upon said conveying mechanism, substantially as described.

13. In a machine of the nature described, a jib, a section hinged to said jib, a scoop supported by said section, conveying mechanism behind and near the scoop, and mechanism for moving said scoop forward with its forward portion low enough to take a load and then raising the scoop and discharging its load backward upon said conveying mechanism, substantially as described.

14. In a machine of the nature described, a scoop, conveying mechanism behind and near the scoop, and mechanism for imparting to the forward portion of the scoop an upright orbital movement and to the rear portion an approximately reciprocatory movement, the forward portion of the scoop going forward through the lower portion of said orbit, whereby said scoop takes its load during such forward movement and then raises said load and discharges it backward upon said conveying mechanism, substantially as described.

15. In a machine of the nature described, a scoop, conveying mechanism behind and near the scoop, crank mechanism for carrying the forward portion of the scoop forward, upward, rearward, and downward and mechanism for guiding the rear portion of said scoop approximately horizontally, substantially as described.

16. In a machine of the nature described, two approximately horizontally opposite, forward-projecting arms, a scoop adapted to move between said arms, mechanism for supporting and moving said scoop forward between said arms with its forward portion in position to take a load and then raising said forward portion and discharging the load backward, substantially as described.

17. In a machine of the nature described, two approximately horizontally opposite, forward-projecting arms, a scoop, driving mechanism supported by said arms and supporting said scoop, substantially as described.

18. In a machine of the nature described, two approximately horizontally opposite, forward-projecting arms, a scoop adapted to move between said arms, mechanism supported by said arms for supporting and moving said scoop forward between said arms with its forward portion in position to take a load and then raising said forward portion and discharging its load backward, substantially as described.

19. In a machine of the nature described, two approximately horizontally opposite, forward-projecting arms, a scoop adapted to move between said arms, and mechanism for moving said scoop in an upright orbit, substantially as described.

20. In a machine of the nature described, two approximately horizontally opposite, forward-projecting arms, a scoop adapted to move between said arms, crank mechanism supported by said arms for supporting and moving said scoop forward between said arms with its forward portion in position to take a load and then raising said forward portion and discharging the load backward, substantially as described.

21. In a machine of the nature described, conveying mechanism, approximately horizontally opposite, forward-projecting arms located in front of said conveying mechanism, a scoop adapted to move between said arms, mechanism for supporting and moving said scoop forward between said arms with its forward portion in position to take a load and then raising said forward portion and discharging the load backward upon said conveying mechanism, substantially as described.

22. In a machine of the nature described, a jib forked at its forward portion, a scoop in the forked portion of said jib, mechanism for supporting and moving said scoop forward with its forward portion in position to take a load and then raising the scoop and discharging the load backward, substantially as described.

23. In a machine of the nature described, a jib forked at its forward portion, conveying mechanism, a scoop in the forked portion of said jib, mechanism for supporting and moving said scoop forward with its forward portion in position to take a load and then raising the scoop and discharging the load backward, substantially as described.

24. In a machine of the nature described, a jib, conveying mechanism upon said machine at the rear of said jib, conveying mechanism upon said jib adapted to discharge upon the first mentioned conveying mechanism, a scoop upon said jib forward of the conveying mechanism upon the jib, and mechanism for actuating said scoop to take loads and discharge them upon the conveying mechanism of said jib, substantially as described.

25. In a machine of the nature described, a conveying mechanism spring-controlled, upward-yielding section, a scoop upon said yielding section, and mechanism for actuating said scoop to take loads and discharge them upon the conveying mechanism, substantially as described.

26. In a machine of the nature described, conveying mechanism, a spring-controlled upward-yielding section, a scoop upon said yielding section, and mechanism for actuating said scoop to take loads and discharge them upon the conveying mechanism, substantially as described.

27. In a machine of the nature described, a jib, a vertically adjustable section on said jib, a scoop upon said section, and mechanism for actuating said scoop to take and lift loads and discharge them, substantially as described.

28. In a machine of the nature described, a scoop comprising a forward section and a rear section, and automatic mechanism for moving said scoop forward to take a load and then raising and inclining said scoop rearward and then tilting said rear section for the discharge of the load, substantially as described.

29. In a machine of the nature described, a scoop comprising a forward section and a rear section, and automatic mechanism for moving said scoop forward to take a load and then raising and inclining said scoop rearward and moving it bodily rearward and then tilting said rear section for the discharge of the load, substantially as described.

30. In a machine of the nature described, a scoop comprising a forward section and a rear section, mechanism for moving the forward portion of said scoop through an upright orbital path and when the upper portion of said path is reached tilting said rear section backward, substantially as described.

31. In a machine of the nature described, a scoop, crank mechanism for imparting an orbital movement to the front of the scoop and mechanism for imparting to the rear portion of said scoop an irregular, approximately horizontal movement, whereby the lower portion of said orbital movement is made horizontal, substantially as described.

32. In a machine of the nature described, a scoop, mechanism engaging the forward portion of the scoop and raising said forward portion so that the scoop becomes partially tilted backward, and other mechanism for further tilting the scoop backward, substantially as described.

33. In a machine of the nature described, a scoop, and mechanism for moving the scoop bodily forward and backward and turning it for the taking of a load and discharging it rearward, substantially as described.

34. In a machine of the nature described, a scoop, conducting mechanism behind said scoop, and mechanism for forward and backward reciprocating and partially rotating said scoop for the taking of a load and discharging it to said conducting mechanism, substantially as described.

35. In a machine of the nature described, a scoop, conducting mechanism behind said scoop, and mechanism for simultaneously turning and bodily moving said scoop forward and backward for the taking of a load and discharging it to said conducting mechanism, substantially as described.

In testimony whereof I have signed my name, in presence of two witnesses, this 29th day of June, in the year one thousand nine hundred and seven.

WILLIAM WHALEY.

Witnesses:
CYRUS KEHR,
ROY V. MYERS.